United States Patent
Williamowski et al.

(10) Patent No.: US 6,434,546 B1
(45) Date of Patent: *Aug. 13, 2002

(54) SYSTEM AND METHOD FOR TRANSFERRING ATTRIBUTE VALUES BETWEEN SEARCH QUERIES IN AN INFORMATION RETRIEVAL SYSTEM

(75) Inventors: Jutta Williamowski, Grenoble (FR); Remo Pareschi, Milan (IT); Uwe M. Borghoff, Hoehenkirchen (DE)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/218,434

(22) Filed: Dec. 22, 1998

(51) Int. Cl.$^7$ .......................... G06F 17/30; G06F 7/00; G06F 17/00
(52) U.S. Cl. .................... 707/3; 707/102; 707/103
(58) Field of Search .................. 707/5, 102, 103, 707/532, 203, 1–10, 100–104, 205

(56) References Cited

U.S. PATENT DOCUMENTS

| | | | | |
|---|---|---|---|---|
| 4,849,898 A | * | 7/1989 | Adi ................................. | 707/5 |
| 5,047,918 A | * | 9/1991 | Schwartz et al. ............ | 707/203 |
| 5,594,641 A | * | 1/1997 | Kaplan et al. ................ | 707/1 |
| 5,642,522 A | * | 6/1997 | Zaenen et al. ............... | 707/532 |
| 5,799,309 A | * | 8/1998 | Srinivasan ................... | 707/102 |
| 6,088,717 A | * | 7/2000 | Reed et al. .................. | 709/201 |
| 6,108,044 A | * | 8/2000 | Medl ............................ | 345/804 |
| 6,169,992 B1 | * | 1/2001 | Beall et al. .................. | 707/103 |

FOREIGN PATENT DOCUMENTS

| | | |
|---|---|---|
| EP | 0 747 845 A1 | 11/1996 |
| WO | WO 98 29792 A2 | 9/1998 |
| WO | WO 98/48359 | 10/1998 |
| WO | WO 98/48361 | 10/1998 |

OTHER PUBLICATIONS

Cousins, S.B., Reification and Affordances in a User Interface for Interacting With Heterogeneous Distributed Applications, A Dissertation submitted to the Department of Computer Science and the Committee on Graduate Studies of Stanford University in partial fulfillment of the requirements for the degree of Doctor of Philosophy, Aug. 1997.

(List continued on next page.)

*Primary Examiner*—Safet Metjahic
*Assistant Examiner*—Te S Chen (57) ABSTRACT

An information retrieval system for retrieving information from multiple information sources. The information retrieval system provides for the building of dynamic queries through the use of query channels. A query channel permits the passing of attributes of the search results between different queries. The query channel can cause the automatic passing of the attributes, or it can be user controlled (breakpoints). Further, the query results may be transformed so that they are in the context of the target query (computational transformations). For example, the results may be translated or reformatted into a form utilized by the target query. Query channels are created based on graphical representations of queries and their attributes. A simple drag and drop operation, wherein an attribute is selected and dragged to the target query, is used to create the channel. A channel may be created while a query is running. Specification of breakpoints or computational transformations are made using a pop-up window interface that may appear when the channel is selected.

18 Claims, 10 Drawing Sheets

OTHER PUBLICATIONS

Kuntz, M., Introduction of Giuku: Graphical Interactive Intelligent Utilities for Knowledgeable Users of Data Base Systems, *Information Systems*, vol. 18, No. 4, 1993, Great Britain, pp. 249–268.

Rao, R. et al., System Components for Embedded Information Retrieval From Multiple Disparate Information Sources, *Proceedings of 1993 ACM Symposium on User Interface Software and Technology*, Atlanta, GA, Nov. 1993, ACM SIGGRAPH and SIGCHI.

Young, D. et al., A Graphical Filter/Flow Representation of Boolean Queries: A Prototype Implementation and Evaluation, *Tech. Report CS–TR–2905*, Univ. of Maryland, Institute for Systems Research, Feb. 1993, pp. 1–31.

Chen, J.R., et al.: "Collaborative Information Agents on the World Wide Web", ACM Conference on Digital Libraries, US, New York, NY: ACM, 1998, pp. 279–280, XP000853973 ISBN: 0–89791–965–3 * the whole document *.

Chen, L., et al.: "Multi–Agents Based Dynamic Request Placement Strategies in Distributed Information Systems", Proc. $9^{th}$ Conf. on Parallel and Distributed Computing Systems, PDCS '96, vol. 2, Sep. 25–27, 1996, pp. 701–708, XP000892307, Dijon, France * p. 706, right–hand col., line 1—line 24; figure 8 *.

* cited by examiner

```
┌─────────────────────────────────────────────────────────┐
│  ┌──────────────────────┐  ┌────────────SUBQUERY─1──┐─301
│  │    MAINQUERY         │  │      SUBQUERY 1        │
│  ├──────────────────────┴──┴────────────────────────┤
│  QUERY CONCERNING  │OPERAS                        ☐ │
│   ┌──────────────┐    ┌──────────────┐  ┌─────────┐ │
│   │ COMPOSER   ☐ │    │ CONTAINS   ☐ │  │ WAGNER  │ │
│   └──────────────┘    └──────────────┘  └─────────┘ │
│              [RESET] [ADD TO SPECIFICATION]         │
│   ┌─────────────────────────────────────────────┐   │
│   │                                             │   │
│   │                                             │   │
│   │                                             │   │
│   │                                             │   │
│   └─────────────────────────────────────────────┘   │
│        [EDIT] [REMOVE] [CLEAR] [CANCEL SUBQUERY]    │
│  GLOBAL OPTIONS:       ☐ CASESENSITIVE SEARCH       │
│                        ☐ ALSO SEARCH WEBCRAWLERS    │
│                   [SUBMIT] [CANCEL]                 │
└─────────────────────────────────────────────────────┘
```

FIG. 3

| RESULTS OF QUERY 1 (BOOKS/ARTICLES) : DATE AFTER 9506 ... |

SHOW [SUMMARY] USING [TITLE] NB OF HITS: [24]

HIT 1: GENERAL AGENTS WEB SERVICE MAINPAGE
HIT 2: IWAH - INTELLIGENT WEB AGENTS / HOUSTON
HIT 3: PERSISTENT JAVA AND MOBILE WEB AGENTS
HIT 4: REAL ESTATE AGENTS WEB PAGES CREATED BY INNOVATIVE...
HIT 5: INTERNET AGENTS: SPIDERS, WANDERERS, BROKERS, AND 'BOTS/FAH-CHENG
HIT 6: PROGRAMMING INTELLIGENT AGENTS FOR THE INTERNET/MARK WATSON
HIT 7: GENERAL AGENTS WEB SERVICES MAINPAGE
HIT 8: INTERACTIVE HOME BUYING ON WEB - REAL ESTATE AGENTS & COMPANIES
HIT 9: HTML WEB PAGE DESIGN AND MARKETING AGENTS
HIT 10: ETHICAL WEB AGENTS
HIT 11: TAHITIWEB - TAHITI AND ITS ISLANDS WEB PAGES - TRAVEL AGENTS
HIT 12: WWW-VRML OCT-DEC 1995: INTERACTIVE AGENTS AND THE WEB
HIT 13: WWW-VRML OCT-DEC 1995: RE: INTERACTIVE AGENTS AND THE WEB
HIT 14: DARTFLOW: A WORKFLOW MANAGEMENT SYSTEM ON THE WEB USING TRANSP
HIT 15: TRAVEL_AGENTS INTERNET MAILING LIST
HOT 16: INTERNET AGENTS (BOOK OUTLINE)

[ALPHABETIC SORT] [QUALITY SORT]

[ALL TO HTML] [SELECTED TO HTML] [DELETE SELECTED HITS] [UNSELECT ALL]

| | | |
|---|---|---|
| 901 | CompQuery: part1 -> QUERY1 | //CompoundQuery contains a query QUERY1 |
| 902 | CompQuery: part2 -> QUERY2 | //CompoundQuery contains a query QUERY2 |
| 903 | CompQuery: part3 -> QUERY3 | //CompoundQuery contains a query QUERY3 |
| 904 | CompQuery: part4 -> CT1 | //CompoundQuery contains a computational transformation CT1 |
| 905 | CompQuery: part5 -> CT2 | //CompoundQuery contains a computational transformation CT2 |
| 906 | QUERY1: domain -> D1 | //QUERY1 has a domain D1 |
| 907 | D1 == "computer science" | //which is "computer science" |
| 908 | QUERY1: title -> T1 | //QUERY1 has a title T1 |
| 909 | T1 contains TC1 | //whose value contains [should contain] |
| 910 | TC1 == "database systems" | //the string "database systems" |
| 911 | QUERY1: author -> A1 | //QUERY1 has also an author A1 |
| 912 | | //- which will be filled by the query results |
| 913 | CT1: domain -> CTD1 | // the computational transformation CT1 |
| 914 | CTD1 == "nameExtraction" | //is of type nameExtraction |
| 915 | CT1: nameList -> A1 | //it will extract all names from A1 |
| 916 | CT1: name -> A11 | // and provide the values as result in A11 |
| 917 | QUERY2: domain -> D2 | |
| 918 | D2 == "computer science" | |
| 919 | QUERY2: title -> T2 | |
| 920 | T2 contains TC2 | |
| 921 | TC2 == "constraints" | |
| 922 | QUERY2: author -> A2 | |
| 923 | CT2: domain -> CTD2 | |
| 924 | CTD2 == "nameExtraction" | |
| 925 | CT2: nameList -> A2 | |
| 926 | CT2: name -> A21 | |
| 927 | QUERY3: domain -> D3 | |
| 928 | D3 == "computer science" | |
| 929 | QUERY3: author -> A3 | |
| 930 | A3 contains A11 | //A11 is used as input in QUERY3 |
| 931 | A3 contains A21 | |

SYSTEM AND METHOD FOR TRANSFERRING ATTRIBUTE VALUES BETWEEN SEARCH QUERIES IN AN INFORMATION RETRIEVAL SYSTEM

FIELD OF THE INVENTION

The present invention is related to the searching of information repositories such as databases, and in particular to a facility for generating and building dynamic queries.

BACKGROUND OF THE INVENTION

Every day more information becomes available electronically over networks. Far from growing linearly, this growth is driven by numerous factors like the increasing accessibility to more media of information, the growing power of computers and networks, and the ever more data-intensive applications we are working with.

This gold mine of data however suffers from a lack of structure and consistency: the Web is unstructured and uncontrolled by nature, whereas structured databases use a widening variety of formats, either standardized or proprietary.

When accessing heterogeneous legacy databases on Intranets or while querying multiple information sources on the Internet, the end-user only wants to have a simple and straightforward point of access.

With classical tools, finding the right information to suit each user's needs is now the problem, for anything but the easiest of searches. The user must master different protocols; different database access methods; different document formats; and then use the information from one search to manually drive another. Thus, there is a need for information retrieval systems and approaches for easily interfacing into multiple information sources.

An exemplary information retrieval architecture is described in the article entitled "System Components For Embedded Information Retrieval From Multiple Disparate Information Sources", Ramana B. Rao, Daniel M. Russell, and Jock D. Mackinlay, Proceedings of 1993 ACM Symposium on User Interface Software and Technology, Atlanta, Ga., November 1993 ACM SIGGRAPH and SIGCHI. The architecture incorporates an intermediary server which mediates access requests between an information access client (i.e. the user) and various information sources. Thus, the user only needs to interface with the information access client in order to retrieve the information from multiple information sources.

Another difficulty in information retrieval is query generation. The process of generating an effective query is often an iterative one. In such a process, the results of one query are then used to formulate a second, often more narrow query. This occurs because the first query may have been too broad in scope and had returned large amounts of unusable or redundant data. Moreover, known query systems are "static" in nature. In other: words, in order for query to begin, all of the query terms must be fixed. However, because of the vast amount of information constantly becoming available on the World Wide Web, it would be desirable to make queries more dynamic in nature. Further, since the information repositories are disparate, portions of the query may be running in parallel. Thus, it would be desirable to be able to specify and execute a query that is dynamic in nature so that search terms are not static.

SUMMARY OF THE INVENTION

The present invention is related to the searching of network accessible distributed databases, such as those found on the Internet. Drag and drop search channels are described which enable the combining of queries. A query is visually displayed on the display of a computer system as a query window. The query window will provide for the input of attributes that define the nature and scope of intended query. The attributes may be logically combined to create the intended query. Each attribute specification is represented as an object. In order to include an attribute of a first query as an attribute of a second query, a user selects an attribute, wherein a graphical representation of the attribute is created. The user then "drags and drops" the graphical representation of the attribute to an attribute specification area of the second query. Thus, a channel of communication between two queries is established which can have the properties described below.

The Drag and Drop Search channels provide Computational Transformations. Computational Transformations allows for the automatic adaptation of the results associated with a channel to the query context. For example, a query attribute may returns results in the English language, whereas the target query would like results in the French language. Thus, a computational transformation could be automatically invoked to translate the results from English to French.

The Drag and Drop Search channels further provides for the ability to create compound queries dynamically and incrementally. Heretofore, query attributes must be defined before they are executed. However this is not always the most effective way to create compound queries. Often the inspection of query results leads to new ideas on how to use them. But, using already obtained query results as input for another query is only possible, if queries can be combined dynamically. The present invention permits queries to be modified dynamically, even while the query is currently running.

The Drag and Drop Search channels further provide breakpoints so that search results may be operated on and manually filtered by the user.

BRIEF DESCRIPTION OF THE DRAWINGS

FIG. 9 illustrates the data structure for a complex query which is used to show the channel relationship between queries, as may be used in the currently preferred embodiment of the present invention.

DETAILED DESCRIPTION OF THE INVENTION

A portion of the disclosure of this patent document contains material which is subject to copyright protection. The copyright owner has not objection to the facsimile reproduction by anyone of the patent document or the patent disclosure, as it appears in the Patent and Trademark Office patent file or records, but otherwise reserves all copyright rights whatsoever.

The present invention is directed to an interface for query generation to and information retrieval from one or more information sources. The currently preferred embodiment is implemented in an information retrieval system which provides software agents that can query multiple heterogeneous databases, reconstruct information and generate customized reports. A description of the system is provided below, while a more comprehensive description as of the time of filing this application can be found on the World Wide Web at URL http:///www.xrce.xerox.com/research/ct/research/cbkb.html.

The present invention builds on the system by providing a facility to build dynamic complex queries. A dynamic complex query is one where query attribute specification is dynamic, rather than static, so that the results (or partial results) of one query can be used as an attribute specification by another query. Furthermore, the facility is made available to a user in a very intuitive fashion using well-known drag and drop graphical user interface methods.

The currently preferred embodiment of the present invention has implemented for use on computer based systems capable of accessing the World Web (the Web) using a suitable Java™ enabled Web Browser. The various software programs utilized in the implementation are written in the well-known Java programming language.

Overview of the Information Retrieval System

Figure 1:
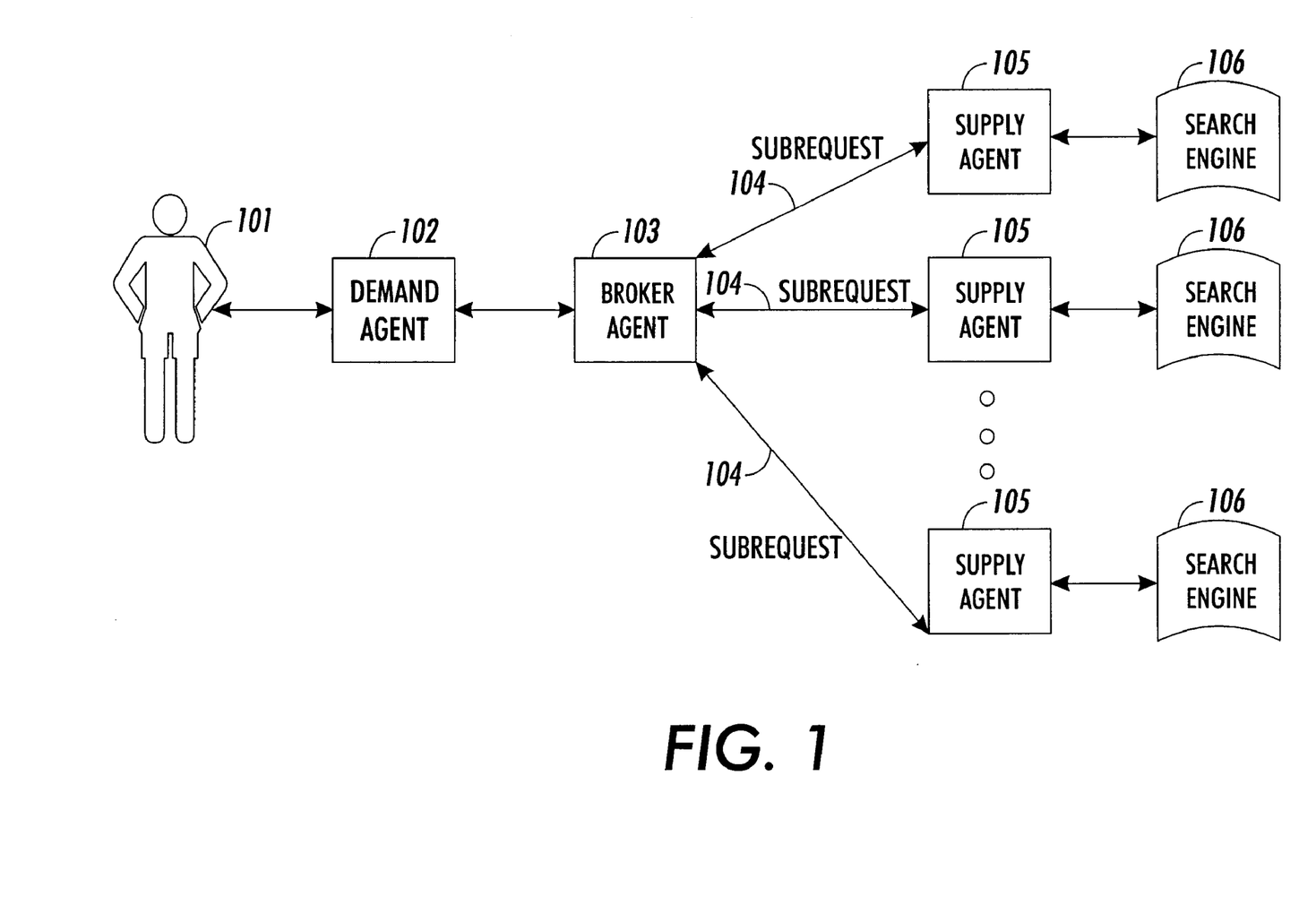
FIG. 1 is a block diagram illustrating the components of and process flow for an information retrieval system of the currently preferred embodiment of the present invention.

The amount of information available from electronic sources on the World Wide Web or other on-line information repositories is increasing exponentially. Tools are needed to extract relevant information from these repositories. The information retrieval system sophisticated facilities for efficient information retrieval and combination. FIG. 1 illustrates how information requests are processed in the information retrieval system. Referring to FIG. 1, a user 101 requests information through a Demand Agent, 102. The Demand Agent 102 typically embodies a User Interface which is presented to a User. In the currently preferred embodiment, the Demand Agent 102 is a Java™ Applet which is downloaded to User's personal computer system and is accessible using a suitably configured Web Browser (such as Netscape Navigator® having the appropriate Java™ software capabilities)

Demand Agents 102 will then present the information request to a Broker Agent 103. The Broker Agents 103 decompose information requests into interdependent subrequests 104. The requests or subrequests that cannot be further decomposed are fed into Supply Agents 105 that access electronic information repositories through search engines 106. The Supply Agents 105 will typically be configured to interface using the protocols of a particular search engine 106. For example, a Supply Agent may be provided to interface and make requests to the Alta Vista™ search engine. In the currently preferred embodiment, the Broker Agents and Supply Agents will operate on a Server system which provides information retrieval.

The results of the information request are received and then recomposed by the Broker Agent 103. It should be noted that the information retrieval system will provide for advanced querying facilities for the user not provided by some information sources, so the re-composition includes further filtering of the results to enable the advanced querying facilities. The recomposition may further include such tasks as formatting the received information and/or ranking the results with respect to the query request. Once the recomposition is completed, the results are returned to the Demand Agents 102 for presentation to the user 101.

It should be noted that preferably, requests, information and results are represented via feature constraints. Requests do not need to be fully defined; they may correspond to partial specifications of the requested information. Furthermore, requests that cannot be fully satisfied may still obtain results in the form of partial objects that refine the initial requests by instantiating some of its attributes or by adding new attributes, thus providing user feedback.

Various aspects of the information retrieval system can be found in the following PCT Publications WO 98/48359 (Oct. 29, 1998) and WO 98/48361 (Oct. 29, 1998).

Each of the various agents described above are preferably embodied as software programs, written in the Java programming language for execution on suitably configured computer based systems.

Information System User Interface

Figure 2:
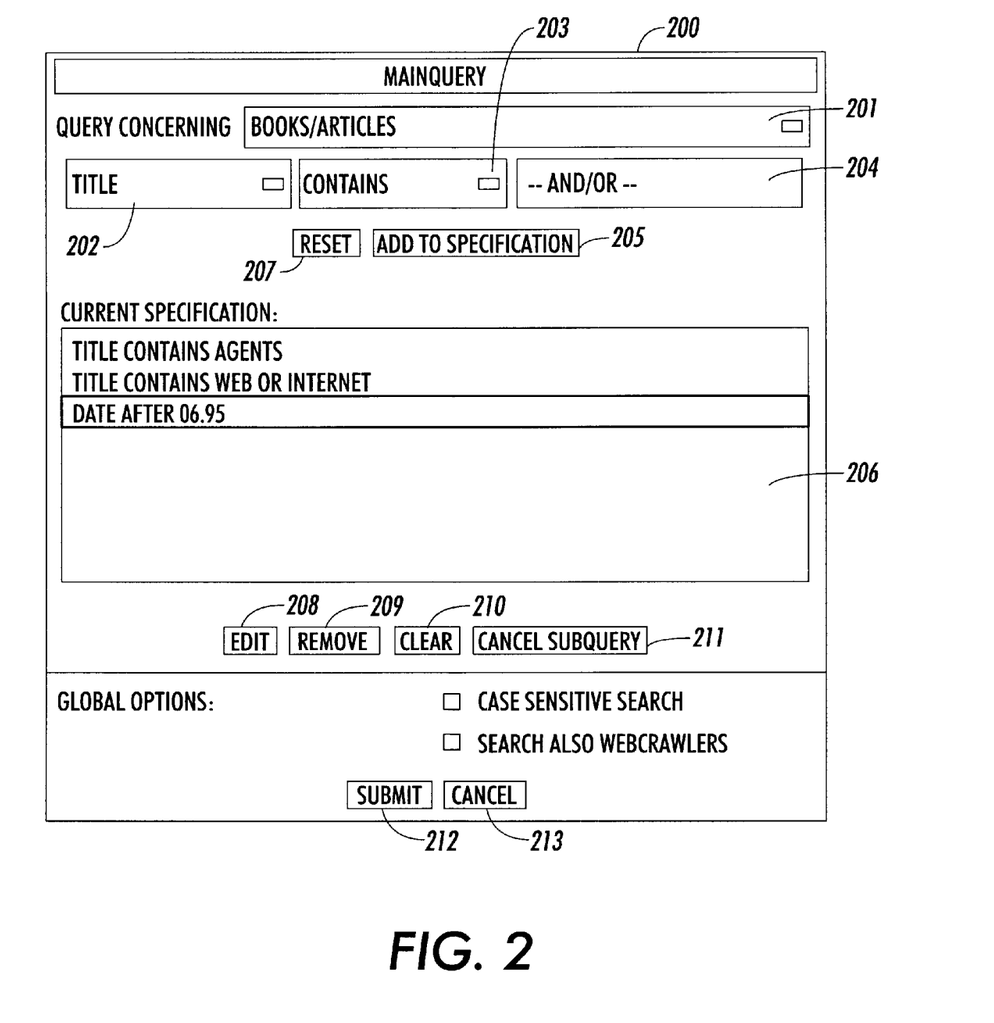
FIGS. 2 and 3 illustrate simple and complex query windows as may be utilized in the currently preferred embodiment of the present invention.

FIG. 2 is an illustration of a query window for specifying a query. Referring to FIG. 2, a domain area 201 of query window 200 provides a means for specifying one of a plurality of predetermined domains for the query. The query domain relates to the type of information being sought. For example, a query domain may be a type of documents (e.g. books or articles) or a subject area (e.g. physics or operas). In the currently preferred embodiment, these domains are predefined and correspond to one or more information sources to which the query will be directed. The areas 202–204 provide for specifying a search pattern. The area 202 is for specifying a predetermined attribute (e.g. title or author). The area 203 is for specifying a constraint (e.g. contains or matches exactly) which is to be placed on the attribute and a specified keyword. The area 204 is for specifying a desired keyword(s), which may define an expression formed by keywords and Boolean operators. If the search pattern is correct, pressing the button 205 labeled "Add to the Specification" causes the pattern to be added to the current specification of the query, as indicated in specification area 206. If the search pattern is not correct, it can be reset using a reset button 207. The specification area 206 includes all the desired search patterns specified by the user.

Buttons 208–211 provide for editing the specification. Button 208 provides for editing a selected search pattern. Button 209 provides means for removing a search pattern. Button 210 provides means for clearing the entire specification. Button 211 provides for cancellation of a sub-query.

Figure 3:
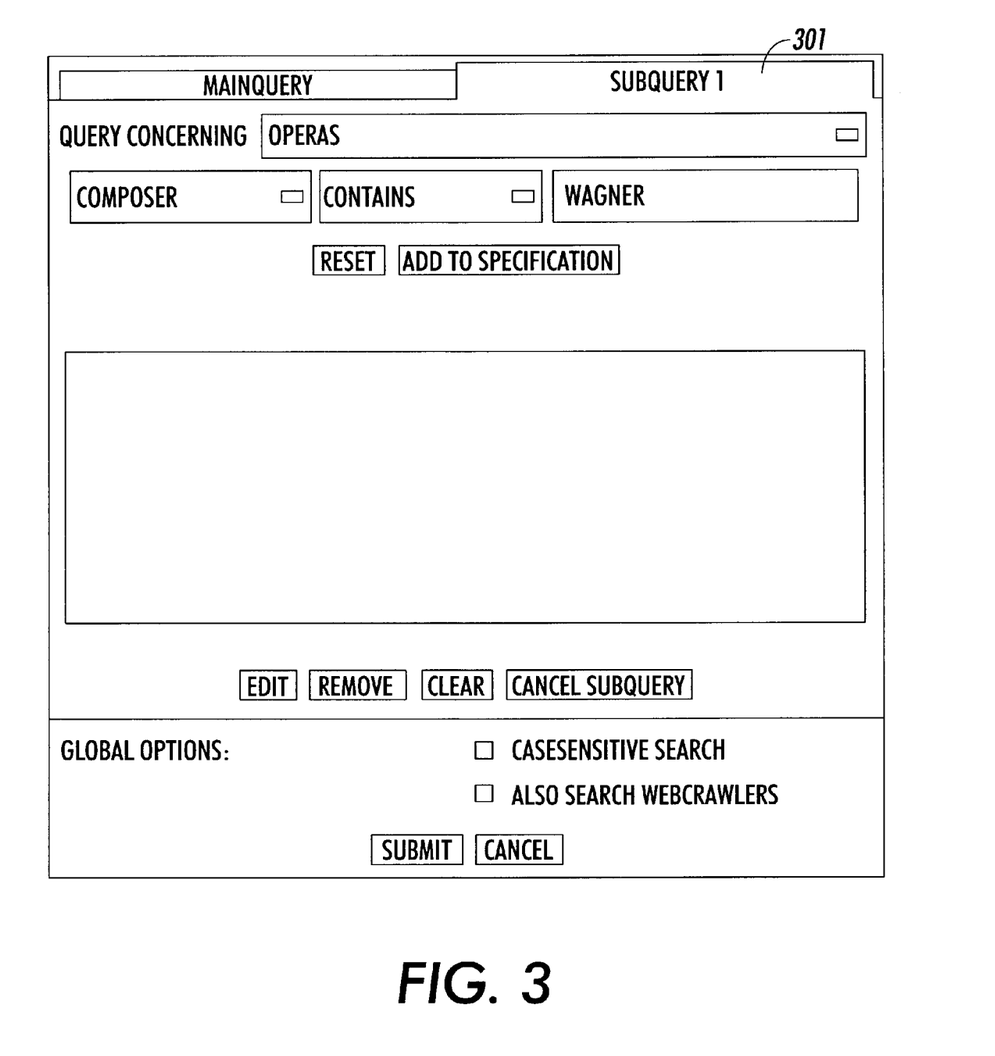

Finally, buttons 212–213, respectively, provide for the control of submission and cancellation of a query. FIG. 3 illustrates a window for performing a sub-query within a query, i.e. a complex query. In a complex query, a sub-query generates a set of subresults. The results generated are subresults in the sense that they deliver values that will be used in the query pattern of the main query (or in general a higher level query). A sub-query is provided for by selecting a predetermined option in the area 203, namely the "answer of" option. This causes the window of FIG. 3 to be displayed. As can be seen in FIG. 3, a new Tab 301 has been included to indicate that it is a sub-query. This also enables the user to traverse between the main query and the sub-query. Note that the rest of the sub-query window is similar to the main query.

Figure 4:
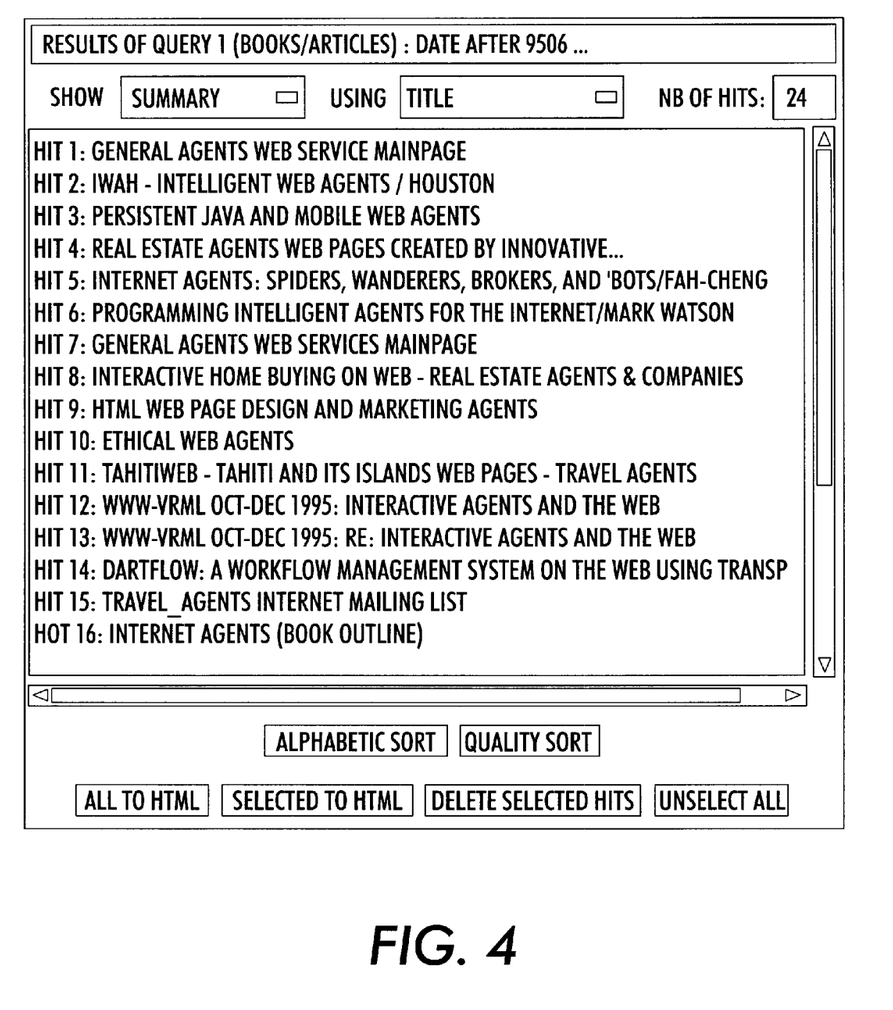
FIGS. 4 and 5 illustrate simple and complex result windows as may be utilized in the currently preferred embodiment of the present invention.
Figure 5:
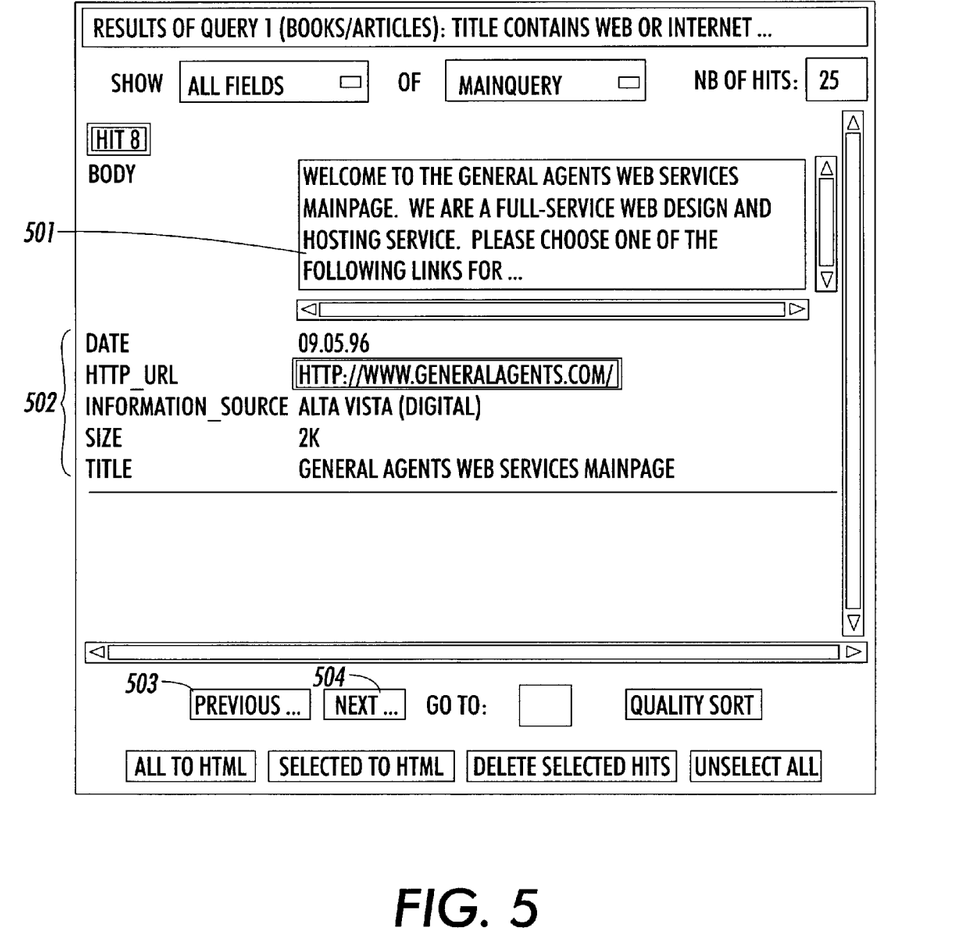

FIGS. 4 and 5 illustrate summary and detail views of the result window from a search. Referring to FIG. 4, a summary view shows a list of all the hits and some overall summary information such as the number of hits. In FIG. 5, all information fields relating to a particular "hit" are displayed. A body area 501 shows the textual content of the document. Information area 502 provides various information such as date, URL location, information source, size and title. In this view, traversal through the list of hits is provided previous 503 and next 504 buttons provided within the window.

Search Channels

Establishing a Drag-and-Drop Channel between two queries amounts to an instruction to pass answers, returned for an attribute field of the source query, as input values for an attribute field in the target query. In one respect, this is conceptually analogous to the relationship between a query and a sub-query. However, the Drag and Drop Channel of the present invention, provides further functionality. The Drag-and-Drop Channels provide:

living links between queries which allow the user to construct compound queries dynamically and incrementally, computational transformations which allow the user to automatically adapt the dragged-and-dropped attribute values to the query context, and breakpoints for user intervention into the search process which allow the user to filter the values passed along the Drag-and-Drop Channels.

Living links Between Queries

Living links between queries allow the user to construct compound queries dynamically and incrementally. The user can introduce Drag-and-Drop Channels between queries not only a priori, but also a posteriori with respect to launching the involved queries.

Usually, e.g. with Structured Query Language (SQL), the definition of compound queries must be done a priori. The user must know in advance how they will link several queries to obtain what they are searching for so the user defines all involved queries and links them before launching the whole compound query.

But this is not always the natural way to create compound queries. Often the inspection of query results leads to new ideas on how to use them. But, using already obtained query results as input for another query is only possible, if queries can be combined dynamically. This is possible through Drag-and-Drop Channels. They can be established a posteriori, when the source query is already (and continuously) running. This a posteriori operation is enabled as a result of a feature provided in the information retrieval system wherein query results may be continually accumulated (i.e. query results-may be continuously returned as a result of new documents being placed within the query domain).

If the Drag-and-Drop Channel is introduced a posteriori the already present results are immediately forwarded to the target query. In any case, all the results arriving after introduction of the Drag-and-Drop Channel are forwarded as they arrive.

Computational Transformations

Computational Transformations provide for the automatic adaptation of the dragged-and-dropped attribute values to the query context. Passing the values from the source attribute of the Drag-and-Drop Channel to its target attribute is not always immediately possible. Problems arise, e.g. if the source and target attributes do not have the same type, arity or unit, or if the general context of the linked queries is different. Then computational transformations are necessary to enable the value passing between the queries. Below are examples of computational transformations:

Example Attribute Type Integration

If you drop an integer attribute on to a string attribute, you have to transform the integer values of the output attribute field to a string value for the input attribute field.

Example Attribute Arity Integration

If the arity of the linked attributes is not the same, especially if the source attribute of the Drag-and-Drop Channel contains a list of values and the target attribute expects single values, then these single values must be extracted from the list before they can be passed to the target query. E.g. if you drop an attribute whose value contains name lists (composed for example of all coauthors of found articles) on an attribute which expects single names (e.g. to search for the person's homepage), then you first have to extract the elementary (sur-)names of the authors, and pass them one-by-one to the input attribute field.

Example Attribute Unit Integration

If the units of the source and the target attribute are different, the values to drop can be automatically calculated, e.g. multiply by 1000 to transform 1 km into 1 000 m, or divide by 60 to transform 1 minute into 1/60 h.

Example Linguistic Integration

The transformations can also be determined by other characteristics of the linked queries, such as their language. If for each query the language is defined (or can be inferred by language guessing for example), and two queries in different languages are linked, then the transformation consists for example in translating the values from the language of the source query to the language of the target query. A manner of performing such cross-lingual information retrieval is described in a co-pending U.S. patent application entitled: "System For Providing Cross-Lingual Information Retrieval", Ser. No. 09/218,431.

If the characteristics of the source and target attributes and queries is known by the system, then these computational transformations can be automatically introduced. Otherwise they can be user defined.

Breakpoints for User Intervention into the Search Process

Drag-and-Drop Channels constitute possible breakpoints for user intervention into the search process. In fact, often the user does not want to automatically pass all the values found for the source attribute of the Drag-and-Drop Channel to its target attribute. Instead, the user wants to control this process and to filter the values manually. Therefore a Drag-and-Drop Channel can be automatic or user-controlled. The user can specify for each Drag-and-Drop Channel if the values shall pass automatically of if the user wants to filter them.

This is especially useful if the query results of the source query have low precision, i.e. if many of the documents in the query result are not adequate for use as input into a subsequent query. If all inadequate values are automatically passed to the subsequent searches, the final results of the compound query would get a very low precision. Thus, making a Drag-and-Drop Channel user-controlled, allows the user to improve the precision of the final results. Furthermore it improves the efficiency of the search process as it also reduces the number of queries generated by the passed values.

The usage of Drag-and-Drop Channels as user filtering points extends also the functionality of a Drag-and-Drop Channel introduced a posteriori before establishing the Drag-and-Drop Channel by dragging the source attribute onto the target attribute, the user might want to suppress some inadequate results or attribute values. This corresponds to a posteriori filtering. In consequence the afterwards established Drag-and-Drop Channel is a user-controlled one.

Figure 6:
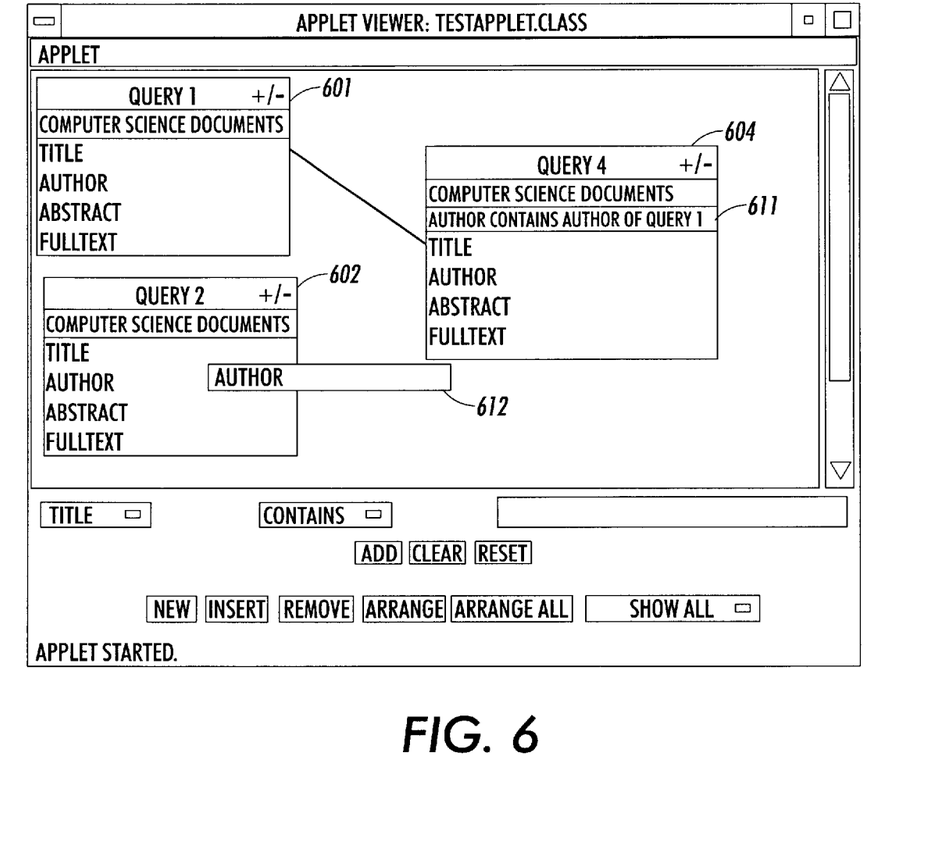
FIGS. 6 and 7 illustrate by way of sample screen displays, an example of the creation of channels between queries, as may be performed in the currently preferred embodiment of the present invention.
Figure 7:
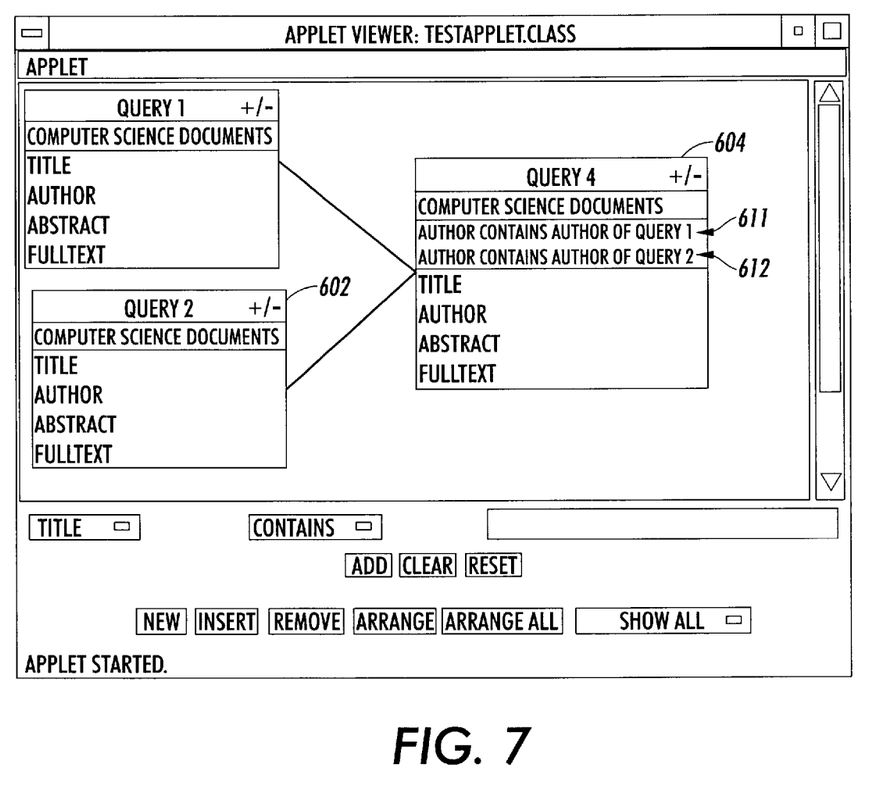

FIGS. 6–7 are illustrative screen displays indicating how channels between queries are created. Referring to FIG. 6, the "author" attribute 611 of query 1 601 has been linked to query 4 604. Here, the author attribute 612 of query 2 602 is also to be linked as an attribute of query 4. As indicated by the highlighting, the author attribute has been selected and is being moved via a drag and drop user interface operation. FIG. 7 illustrates the results wherein query 4 604 now also contains the results of the author attribute 612 of query 2 602 are included as an attribute of query 4 604

Figure 8:
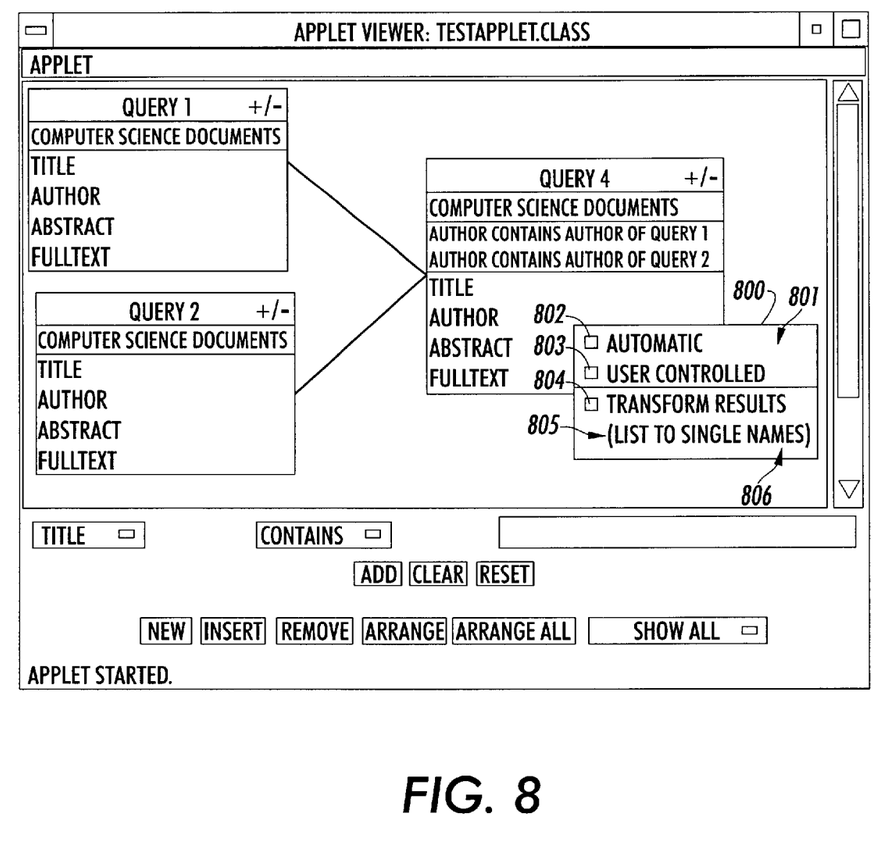
FIG. 8 illustrates by way of a sample screen display, a user interface for specifying computational transformations or breakpoints in a channel between queries, as may be performed in the currently preferred embodiment of the present invention.

FIG. 8 is an illustrative screen display showing an interface for specifying operational characteristics of a channel between queries. Referring to FIG. 8, assuming that the channel with query 2 has been selected and a user interface action, such as a double mouse click, has been performed to cause a pop-up control window 800 be displayed. This pop-up control window is used to select the various control features for a channel. So for example, a first selection area 801 has check boxes 801 and 802 which permits one to select between automatic or user controlled transfer of attribute query results. This is the manner in which breakpoints can be introduced in the target query (in this case query 4).

A second selection area 806 has a check box 804 that is used to specify if it is desirable to automatically transform the attribute results to be in the target query context. Here, the transformation is automatically identified 805 based on the source and target query context (e.g. query 2 presents retrieves Author information in List format, whereas query 4 retrieves Author information in single name format). The above is but one way of how operational characteristics of a link can be specified and is not meant to be limit the scope of the present invention. Other ways could be utilized, such as through a control checkbox associated with a channel, and would not cause departure from the spirit and scope of the present invention.

It should be noted that the user interfaces illustrated in FIGS. 6–8 would typically be presented to a user through a Demand Agent, as illustrated in FIG. 1.

Query Data Structure

FIG. 9 is an example of a data structure for a complex query showing the relationship of channels between queries. It should be noted that a simple query would typically have a structure found in one of the sub-queries described in FIG. 9. In any event, referring to FIG. 9, lines 901–905 define the parts of the query. In this case, three (3) sub-queries are defined along with two (2) computational transformations. The definition of query 1 begins at line 906 and ends at line 916. From these lines it is shown that Query 1 has a domain of "computer science", a query attribute wherein the title contains the string "database systems" and a query attribute of author which is filled in by the query. A computational transformation of type "nameExtraction", is performed on the content of the author attribute and stored in a location indicated as "A11" (lines 911–916).

The definition of query 2 begins at line 917. The domain of query 2 is "Computer science" and the title should have the word "constraints" in it. In query 2, the author attribute is subject to the same computational transformation as found in query 1 Lines 922–926).

Finally, the query 3 begins on line 927. In query 3, the domain is "computer science" and the author attribute contains the results of the author attributes of queries 1 and 2. This is the channel established between query 3 and each of queries 1 and 2.

Typically, the data structure of FIG. 9 would be interpreted by a broker agent as illustrated in FIG. 1.

Figure 10:
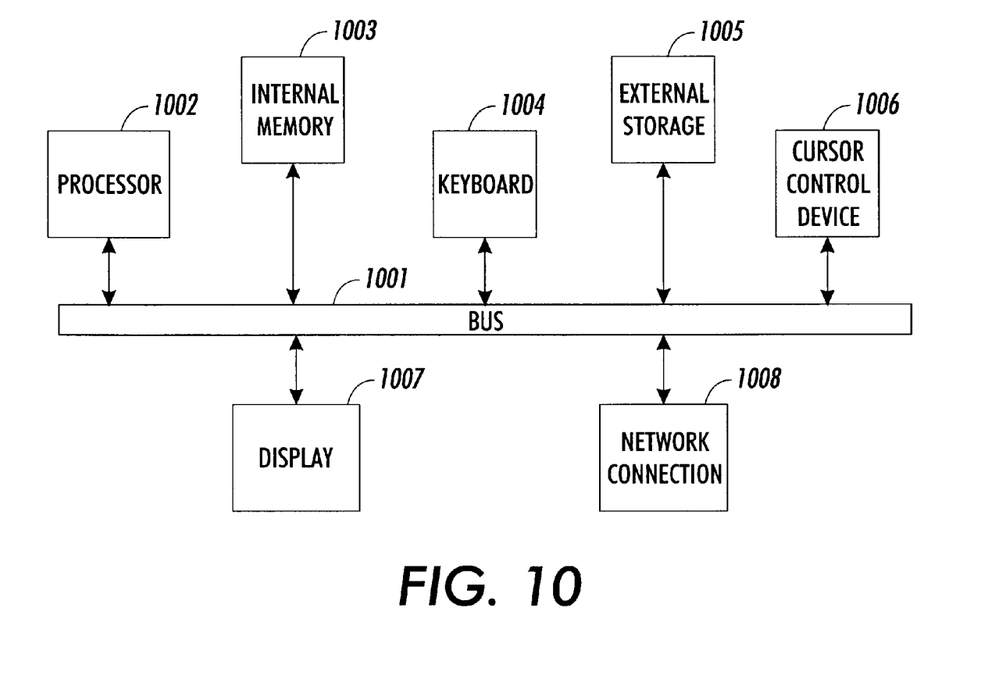
FIG. 10 is an illustration of a computer-based system as may be used to implement the currently preferred embodiment of the present invention.

Computer Based System of the Currently Preferred Embodiment of The Present Invention The computer-based system on which the currently preferred embodiment of the present invention may be implemented is described with reference to FIG. 10. For example, the computer based system 10 may embody a user system upon which a demand agent executes and the user interface presented to a user, or it may be server system wherein the various broker and supply agents would execute. In any event, referring to FIG. 10, the computer-based system is comprised of a plurality of components coupled via a bus 1001. The bus 1001 illustrated here is simplified in order not to obscure the present invention. The bus 1001 may consist of a plurality of parallel buses (e.g. address, data and status buses) as well as a hierarchy of buses (e.g. a processor bus, a local bus and an I/O bus). In any event, the computer system is further comprised of a processor 1002 for executing instructions provided via bus 1001 from Internal memory 1003 (note that the Internal memory 1003 is typically a combination of Random Access or Read Only Memories). The processor 1002 and Internal memory ROM 1003 may be discrete components or a single integrated device such as an Application Specification Integrated Circuit (ASIC) chip which has been designed to embody the functional features of the present invention.

Also coupled to the bus 1001 are a keyboard 1004 for entering alphanumeric input, external storage 1005 for storing data, a cursor control device 1006 for manipulating a cursor, and a display 1007 for displaying visual output. The keyboard 1004 would typically be a standard QWERTY keyboard but may also be telephone like keypad. The external storage 1005 may be fixed or removable magnetic or optical disk drive. The cursor control device 1006 will typically have a button or switch associated with it to which the performance of certain functions can be programmed. The network connection 1008 would be used to receive and/or transmit data containing a bit-mapped representation of a medium.

Thus, search channels between queries for use in an information retrieval system has been disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

What is claimed is:

1. An information retrieval system for generating queries to one or more information sources, said information retrieval system comprising:
   a demand agent providing:
      a user interface for allowing a user to specify a search expression;
      a query specification interface for allowing a user to specify a dynamic channel between a first query and a second query wherein the search results for an attribute of said first query are provided as a search attribute of said second query, said dynamic channel specified and operational while said first query or said second query is being executed;

a broker agent providing
- a search and retrieval element for processing a search expression and creating specific information source search requests;
- a channel element for associating the results of an attribute of said first query with said input attribute of said second query;
- a supply agent for receiving said search requests and requesting and obtaining documents from information sources responsive to said search requests.

2. The system as recited in claim 1 wherein said demand agent is further comprised of a channel control interface for causing user controls on said channel.

3. The system as recited in claim 2 wherein a first user control is a computational transformation for transforming the results of the search for said first attribute into the query context of said second query; and wherein said broker agent is further comprised of an element for causing an associated computational transformation to occur.

4. The system as recited in claim 3 wherein said computational transformation is a translation from a source language to a target query language.

5. The system as recited in claim 3 wherein said computational transformation is an attribute type integration.

6. The system as recited in claim 3 wherein said computational transformation is an attribute arity integration.

7. The system as recited in claim 3 wherein said computational transformation is an attribute unit integration.

8. The system as recited in claim 2 wherein said a second user control is for specifying automatic or user controlled transfer; and wherein said broker agent is further comprised of an element for causing said user controlled transfer when specified by said user.

9. A method for obtaining information from one or more information sources from an information retrieval system, said method comprising the steps of:
   a) a user specifying one or more query attributes for a first query and causing said first query to be executed by said information retrieval system;
   b) said user specifying a second query while said first query is being executed, wherein at least one of said attributes for said second query is the results of a query attribute from said first query;
   c) said information retrieval system providing the results of said first query;
   d) said information retrieval system extracting from the results of said first query, the results for said specified query attribute;
   e) said information retrieval system providing said results for said specified query attribute as a an input attribute for said second query; and
   f) said information retrieval system providing said user with the results of said second query.

10. The method as recited in claim 9 wherein prior to said step of said information retrieval system providing said results for said specified query attribute as a result for said second query, said user performing the step of specifying that a computational transformation should be performed on said results for said specified query attribute so that said results are in a context of said second query; and said system performing said computational transformation as results are received.

11. The method as recited in claim 10 wherein said computational transformation is a translation from a source language to a target query language.

12. The method as recited in claim 10 wherein said computational transformation is an attribute type integration.

13. The method as recited in claim 10 wherein said computational transformation is an attribute arity integration.

14. The method as recited in claim 10 wherein said computational transformation is an attribute unit integration.

15. The method as recited in claim 9 wherein prior to said step of said information retrieval system providing said results for said specified query attribute as a result for said second query, said user performing the step of specifying that said results for said specified query attribute should be user controlled; and said system providing said user the ability to exclude results from being provided to said second query.

16. A program storage device readable by a machine, tangibly embodying a program of instructions executable by the machine to perform method steps for obtaining information from one or more information sources from an information retrieval system, said method comprising the steps of:
   a) a user specifying one or more query attributes for a first query and causing said first query to be executed by said information retrieval system;
   b) said user specifying a second query while said first query is being executed, wherein at least one of said attributes for said second query is the results of a query attribute from said first query;
   c) said information retrieval system providing the results of said first query;
   d) said information retrieval system extracting from the results of said first query, the results for said specified query attribute;
   e) said information retrieval system providing said results for said specified query attribute as an input attribute for said second query; and
   f) said information retrieval system providing said user with the results of said second query.

17. The method steps as recited in claim 16 wherein prior to said step of said information retrieval system providing said results for said specified query attribute as a result for said second query, said user performing the step of specifying that a computational transformation should be performed on said results for said specified query attribute so that said results are in a context of said second query; and said system performing said computational transformation as results are received.

18. The method as recited in claim 16 wherein prior to said step of said information retrieval system providing said results for said specified query attribute as a result for said second query, said user performing the step of specifying that said results for said specified query attribute should be user controlled; and said system providing said user the ability to exclude results from being provided to said second query.

* * * * *